US010302949B2

(12) United States Patent
Takeda et al.

(10) Patent No.: US 10,302,949 B2
(45) Date of Patent: May 28, 2019

(54) VIRTUAL IMAGE DISPLAY APPARATUS INCLUDING A DIFFRACTION OPTICAL MEMBER HAVING A DIFFRACTION SECTION AND A LIGHT TRANSMISSIVE SUBSTRATE

(71) Applicant: SEIKO EPSON CORPORATION, Suwa-shi, Nagano (JP)

(72) Inventors: Takashi Takeda, Suwa (JP); Mitsutaka Ide, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 99 days.

(21) Appl. No.: 15/696,326

(22) Filed: Sep. 6, 2017

(65) Prior Publication Data

US 2018/0095281 A1 Apr. 5, 2018

(30) Foreign Application Priority Data

Sep. 30, 2016 (JP) ................................. 2016-192988

(51) Int. Cl.
*G02B 5/18* (2006.01)
*G02B 27/01* (2006.01)
*G02B 27/10* (2006.01)
*G02B 27/42* (2006.01)

(52) U.S. Cl.
CPC ..... *G02B 27/0172* (2013.01); *G02B 27/1006* (2013.01); *G02B 27/1086* (2013.01); *G02B 27/4211* (2013.01); *G02B 2027/0116* (2013.01); *G02B 2027/0178* (2013.01)

(58) Field of Classification Search
CPC ...... G02B 5/18; G02B 5/1814; G02B 5/1842; G02B 5/1861; G02B 5/32; G02B 27/0025; G02B 27/0037; G02B 27/005; G02B 27/0056; G02B 27/0062; G02B 27/01; G02B 27/001; G02B 27/0103; G02B 2027/011; G02B 2027/0112; G02B 2027/0116; G02B 27/017; G02B 27/0172; G02B 27/0174; G02B 27/10; G02B 27/1006; G02B 27/1086; G02B 27/42; (Continued)

(56) References Cited

U.S. PATENT DOCUMENTS 7,295,377 B2 * 11/2007 Edelmann ............ G02B 5/1814 345/8
10,162,180 B2 * 12/2018 Cakmakci ................ H04N 5/33
2016/0161755 A1 6/2016 Yonekubo et al.
(Continued)

FOREIGN PATENT DOCUMENTS

JP 2012-013908 A 1/2012
JP 2016-109923 A 6/2016

*Primary Examiner* — Arnel C Lavarias
(74) *Attorney, Agent, or Firm* — Oliff PLC (57) ABSTRACT

A virtual image display apparatus includes a diffraction optical member including a diffraction section that directs the orientation of image light based on diffraction toward the position of a viewer's eye and a light transmissive substrate that is disposed in the diffraction section and on the side facing the eye and supports the diffraction section, and an image forming section that outputs the image light toward the diffraction optical member, and the light transmissive substrate is a color separation correcting section that corrects color separation produced by the diffraction section.

15 Claims, 9 Drawing Sheets

(58) Field of Classification Search
CPC ............ G02B 27/4205; G02B 27/4211; G02B 27/4216
USPC ....... 359/558, 566, 569, 570, 571, 572, 574, 359/575, 576, 8, 13, 14, 629, 630, 631
See application file for complete search history.

(56) References Cited

U.S. PATENT DOCUMENTS

2016/0238844 A1* 8/2016 Dobschal ........... G02B 27/0172
2018/0095283 A1* 4/2018 Takeda ............... G02B 27/0172

* cited by examiner

VIRTUAL IMAGE DISPLAY APPARATUS INCLUDING A DIFFRACTION OPTICAL MEMBER HAVING A DIFFRACTION SECTION AND A LIGHT TRANSMISSIVE SUBSTRATE

BACKGROUND

1. Technical Field

The present invention relates to a head mounted display mounted around the head for use and other virtual image display apparatus.

2. Related Art

In recent years, as a virtual image display apparatus that allows formation and observation of a virtual image, such as a head mounted display, a variety of types have been proposed.

For example, there is a known video display apparatus that allows observation of a virtual image by using a volume-phase-type, reflective holographic optical element (see JP-A-2012-13908). In the apparatus, a plane including the optical axis of light incident on the holographic optical element and the optical axis of light reflected off the holographic optical element is defined as a principal plane. JP-A-2012-13908 discloses that the surface of the holographic optical element is formed of a concave curved surface that is symmetric with respect to the principal plane, has curvature only in planes parallel to the principal plane, is formed on a viewer's pupil side, and is characterized in that the radius of curvature of the surface in each of the planes decreases with distance from the position closest to the center of a display surface toward the position farthest from the center of the display surface. JP-A-2012-13908 further discloses that the holographic optical element is formed on the viewer's side surface of a substrate or a surface thereof facing away from the viewer's side surface to form a projection system.

There is also a known image display apparatus that guides light from a video light generator via a first diffraction optical element to an optical scanner, causes the light from the optical scanner to be incident via an optical element for pupil enlargement on a second diffraction optical element, and causes the light reflected off the second diffraction optical element to exit toward the eyes (see JP-A-2016-109923).

In the video display apparatus disclosed in JP-A-2012-13908, color separation is produced by the holographic optical element and the light guide body that supports the holographic optical element, but no consideration to color separation, such as the complex color separation described above, is given. In the virtual image display apparatus disclosed in JP-A-2016-109923, the safety is always a concern because the retina is directly irradiated with laser light. Other problems include necessity of a high-precision optical element for enlarging the width of a light flux and a decrease in the light use efficiency due to use of a plurality of diffraction elements.

SUMMARY

An advantage of some aspects of the invention is to provide a virtual image display apparatus that produces only a small amount of color separation and is compact and lightweight.

A virtual image display apparatus according to an aspect of the invention includes a diffraction optical member including a diffraction section that directs orientation of image light based on diffraction toward a position of a viewer's eye and a light transmissive substrate that is disposed in the diffraction section and on a side facing the eye and supports the diffraction section, and an image forming section that outputs the image light toward the diffraction optical member, and the light transmissive substrate is a color separation correcting section that corrects color separation produced by the diffraction section.

In the virtual image display apparatus described above, since the light transmissive substrate is a color separation correcting section that corrects color separation produced by the diffraction section, the color separation produced by the diffraction at the diffraction section can be corrected without any increase in the size of an optical system for projection or any other component, whereby high-definition color display is achieved. It is noted that the light transmissive substrate corrects the color separation produced by the diffraction at the diffraction section on the basis of color separation produced by the combination of refraction of the image light at the time of incidence and refraction of the image light having undergone angular conversion at the diffraction section at the time of exit.

In a specific aspect of the invention, in the virtual image display apparatus described above, color separation produced by refraction of the image light when the image light is incident on the light transmissive substrate and exits out of the light transmissive substrate is oriented in a direction opposite a direction of the color separation produced by the diffraction section. When the direction of the color separation resulting from the light transmissive substrate is opposite the direction of the color separation produced by the diffraction section, the two types of color separation cancel each other, whereby the color separation can be reliably corrected.

In another aspect of the invention, an incident angle of the image light incident on the diffraction optical member ranges from 50 to 80° with reference to a case where the viewer looks at an object right in front of the viewer. In this case, the incident angle of the image light incident on the diffraction optical member can have a relatively large value, whereby the optical path of the image light can be readily ensured, and the amount of correction of the color separation corrected by the color separation correcting section can have a relatively large value. The color separation can therefore be reliably corrected.

In still another aspect of the invention, the diffraction section causes obliquely incident image light to exit roughly in a direction of a normal to a surface that forms the light transmissive substrate and faces the diffraction section. In this case, the diffraction optical member can be so disposed as to be relatively corresponding with respect to the viewer's eye, whereby the exterior appearance of the diffraction optical member can be similar to that of a spectacle lens with the thickness of the diffraction optical member reduced.

In still another aspect of the invention, the color separation correcting section transmits the image light at transmittance of 50% or higher.

In still another aspect of the invention, the light transmissive substrate has any of a flat surface, a spheroidal surface, a cylindrical surface, and a free-form surface. When the light transmissive substrate has a flat surface or a cylindrical surface, in particular, the diffraction section can be readily produced and assembled.

In still another aspect of the invention, the diffraction optical member includes an outer substrate disposed outside the light transmissive substrate via the diffraction section and having optical transparency. Providing the outer substrate allows the diffraction section to be sandwiched between the light transmissive substrate and the outer substrate and therefore protected.

In still another aspect of the invention, the diffraction optical member has a diopter of roughly zero in see-through observation of an outside object. In this case, the front field of view can be naturally observed.

In still another aspect of the invention, the diffraction section is one of a hologram and a surface relief diffraction grating. In the case of a typical hologram, it is not easy to eliminate color separation produced by the hologram itself, but color separation produced by the combination of the hologram and the light transmissive substrate or any other component can be reduced to improve the image quality. In the case of a volume hologram, in particular, although color separation produced by the volume hologram itself can be eventually eliminated in a design process, color separation produced by the combination of the volume hologram and the light transmissive substrate or any other component can be reduced to improve the image quality. In the case of a surface relief diffraction grating, although it is typically not easy to eliminate color separation produced by the surface relief diffraction grating itself, color separation produced by the combination of the surface relief diffraction grating and the light transmissive substrate or any other component can be reduced to improve the image quality.

In still another aspect of the invention, the virtual image display apparatus further includes a lens system disposed between the image forming section and the diffraction optical member, and the light transmissive substrate cooperates with the lens system to correct the color separation produced by the diffraction section. The lens system may include a mirror as part of the lens system. The lens system plays a role as a component that adjusts the state of the image light to be incident on the diffraction section and can therefore improve the quality of a virtual image formed by the diffraction optical member. In this case, the combination of the lens system and the diffraction optical member as a whole reduces the color separation, whereby high-definition color display is achieved.

In still another aspect of the invention, the lens system includes a mirror that deflects an optical path. In this case, the lens system can be arranged with increased flexibility, whereby the exterior appearance of the virtual image display apparatus can be designed with increased flexibility.

In still another aspect of the invention, the mirror is supported by a member that extends from the diffraction optical member. In this case, the arrangement relationship between the diffraction optical member and the mirror can be readily maintained, whereby the exterior appearance can be readily simplified.

In still another aspect of the invention, an intermediate image is formed between the lens system and the diffraction optical member. In this case, a relatively large intermediate image can be formed in the vicinity of the diffraction optical member, and the image forming section as well as an optical section and other components adjacent to the image forming section can be reduced in size with the image forming section disposed in a position sufficiently separate from the position of the eye.

In still another aspect of the invention, the image forming section outputs the image light with principal rays thereof roughly parallelized, and the diffraction optical member parallelizes the image light from the intermediate image. In this case, the optical system of the virtual image display apparatus can be so configured that required precision of the arrangement and specifications of the image forming section is suppressed to readily achievable values.

In still another aspect of the invention, the virtual image display apparatus further includes a holder that holds the diffraction optical member and the image forming section to allow the diffraction optical member and the image forming section to be located in front of the viewer's eye. The thus configured holder allows the image forming section to be appropriately arranged with respect to the diffraction optical member. Further, when the holder has a shape similar to a spectacle frame, the exterior appearance of the virtual image display apparatus can be similar to that of spectacles.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A virtual image display apparatus according to a first embodiment of the invention will be described below with reference to the drawings.

Figure 1:
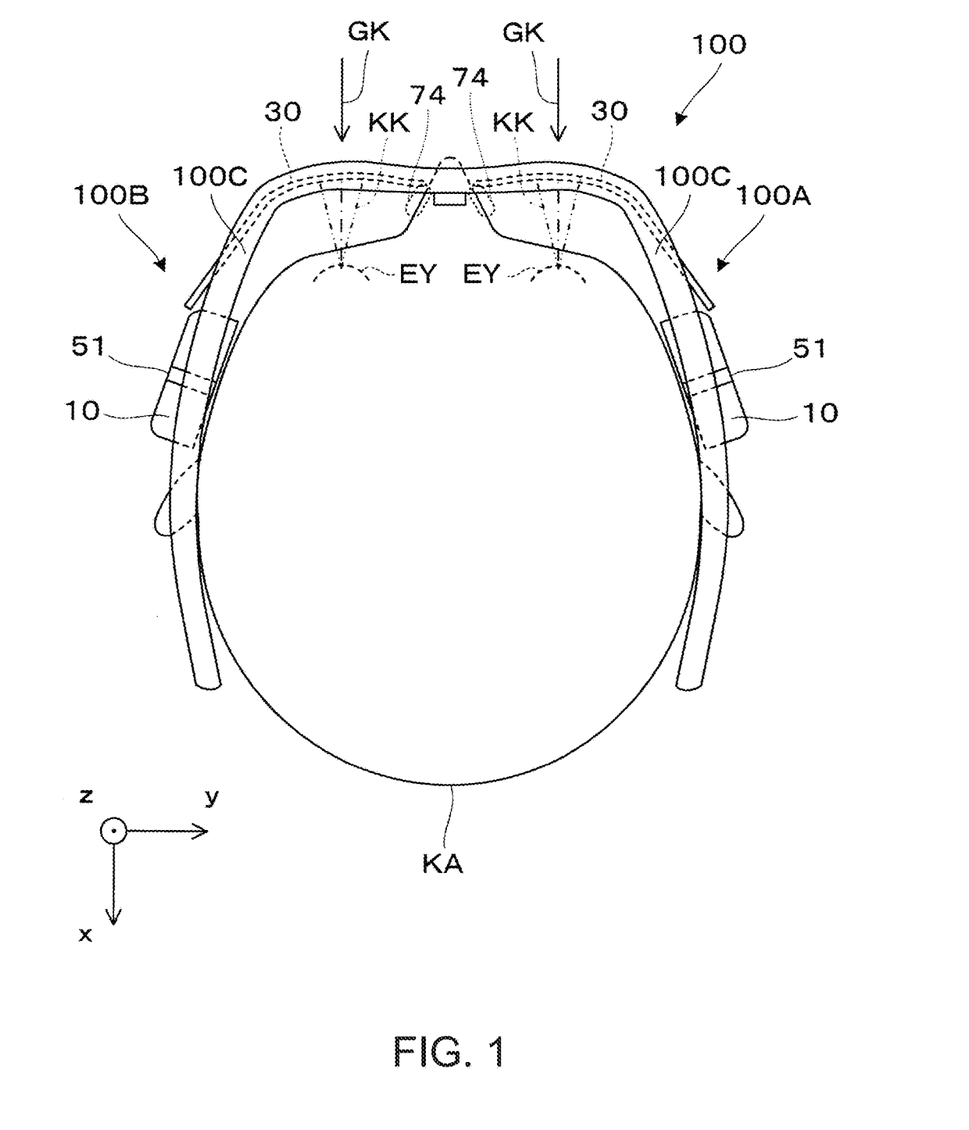
FIG. 1 is a plan view of a virtual image display apparatus according to a first embodiment.
Figure 2A:
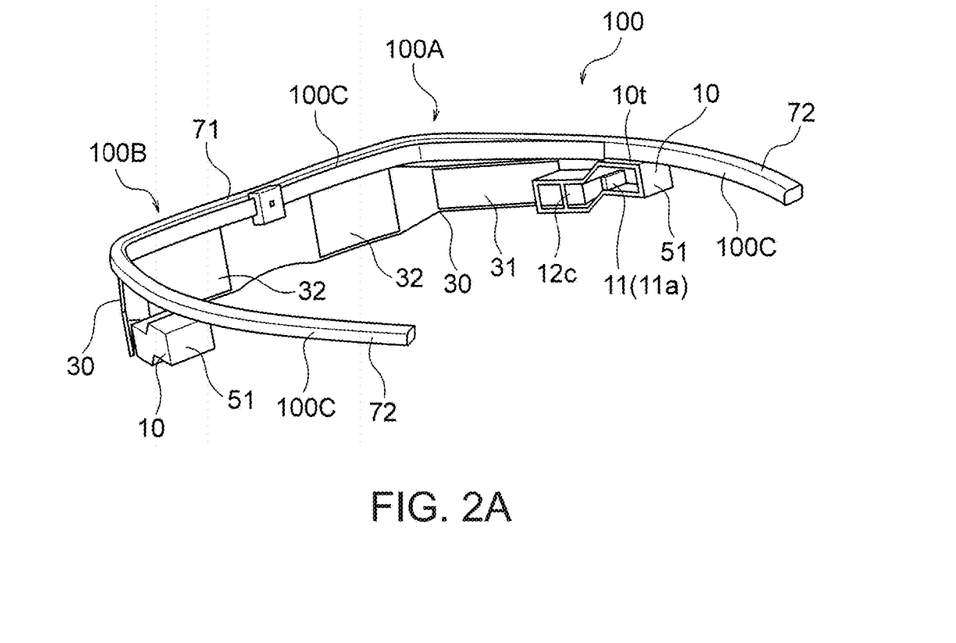
FIG. 2A is a perspective view of the virtual image display apparatus shown in FIG. 1 and viewed from obliquely rear.
Figure 2B:
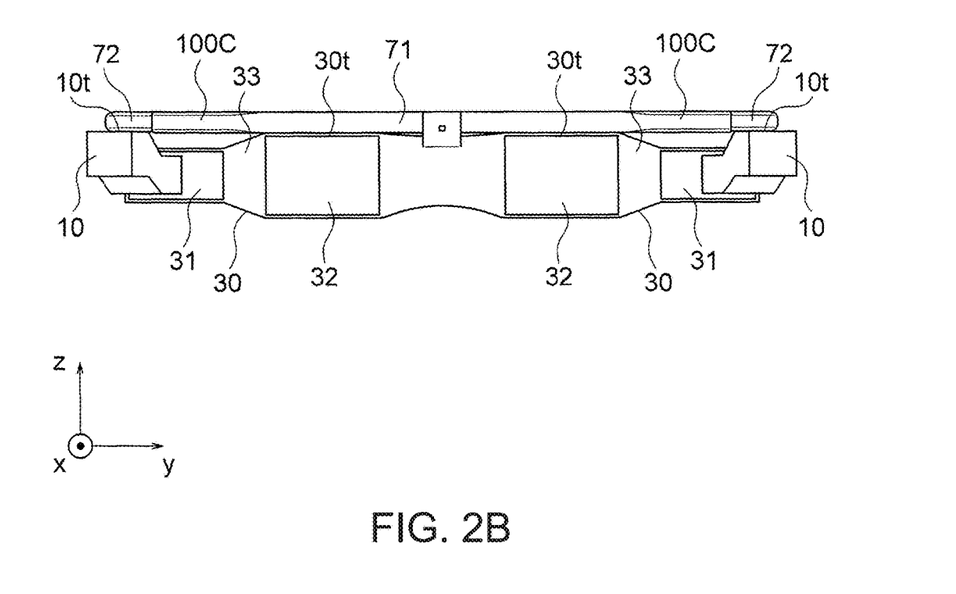
FIG. 2B is a rear view of the virtual image display apparatus shown in FIG. 1.

A virtual image display apparatus 100 shown in FIGS. 1, 2A, and 2B is a spectacle-shaped head mounted display and includes a pair of right and left virtual image display sections 100A, 100B. The virtual image display apparatus 100 causes image light KK in the form of a virtual image to be incident on eyes EY of a viewer KA, who is a person on whom the virtual image display apparatus 100 is mounted, to allow the viewer KA to recognize a variety of images, such as motion images and still images, and further permits outside light GK from an outside image to be incident on the eyes EY of the viewer KA to allow the viewer KA to view the outside image or a see-through image. The virtual image display sections 100A and 100B are supported by a frame 100C, which is a holder common to the virtual image display sections 100A and 100B, and the frame 100C maintains the relative arrangement relationship between the virtual image display sections 100A and 100B and the relative arrangement relationship among a plurality of optical parts that form the virtual image display sections 100A and 100B.

The right virtual image display section 100A includes a set of an optical engine 10 and a cover-shaped optical system 30. The left virtual image display section 100B also includes a set of an optical engine 10 and a cover-shaped optical system 30. In the following sections, the structure and function of the right virtual image display section 100A will be primarily described, and no redundant description of the structure and function of the left virtual image display section 100B will be made because the right and left virtual image display section 100A, 100B have the same structure and function.

The optical engine 10 forms an image that serves as a source of a virtual image presented to the viewer KA on whom the virtual image display apparatus 100 is mounted. The optical engine 10 forms an intermediate image in a predetermined position inside the cover-shaped optical system 30 or in a position shifted therefrom toward the viewer KA, and the cover-shaped optical system 30 converts the intermediate image into a virtual image. The optical engine 10 is accommodated in an enclosure 51 and includes a display device 11 and a relay system body 12c. In FIG. 2A, the interior of the enclosure 51 is exposed with part thereof drawn in a cutaway view for ease of description.

Figure 3:
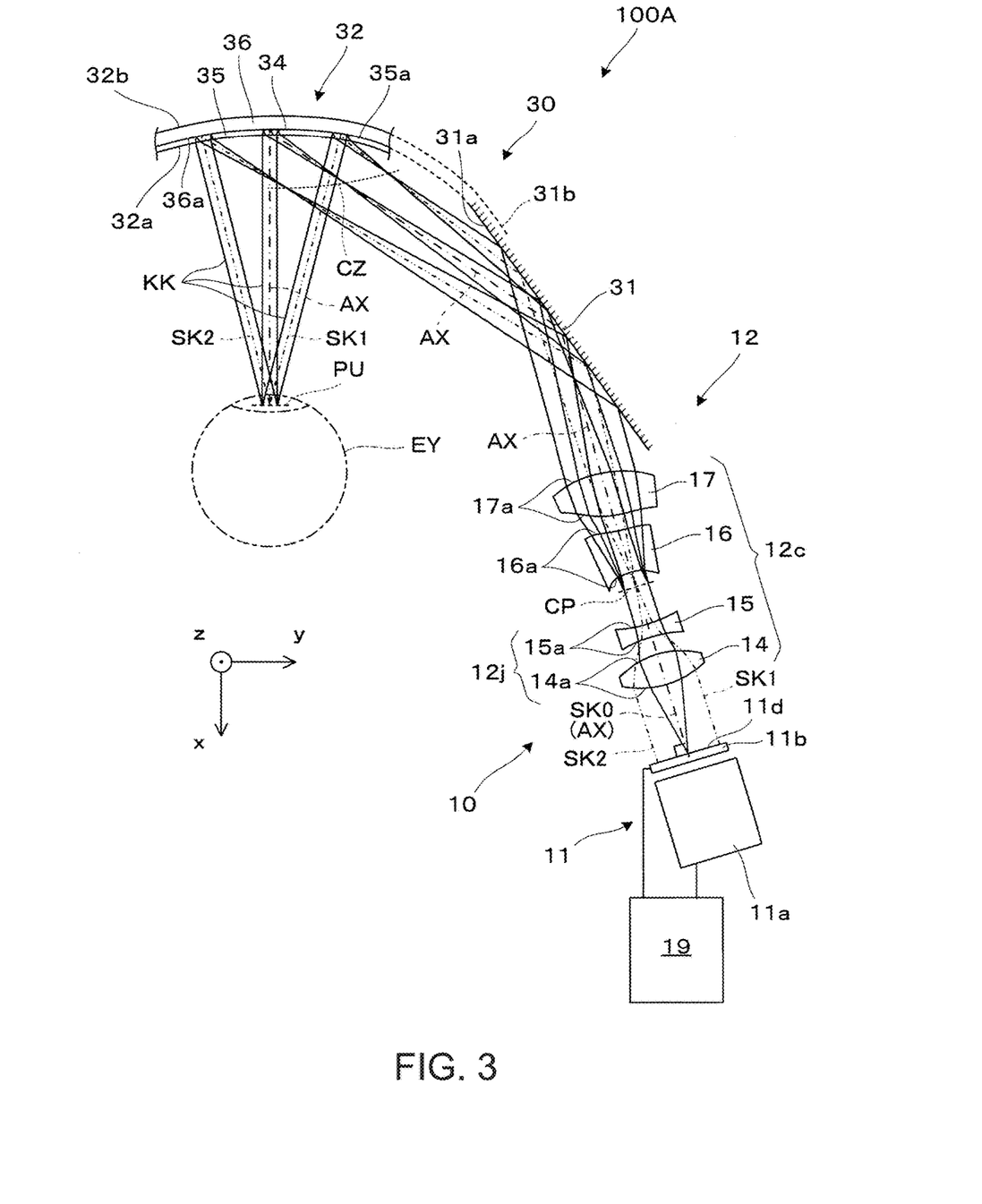
FIG. 3 is a plan view for describing an optical system on one side in the virtual image display apparatus.

With reference to FIG. 3, the display device 11 of the optical engine 10 is an image forming section that outputs the image light KK toward the cover-shaped optical system 30. The display device (image forming section) 11 is driven by a drive circuit 19, which operates under the control of a controller that is not shown, to perform display operation. The display device 11 is, for example, a combination of an illumination apparatus 11a and light modulating panels 11b. The illumination apparatus 11a includes narrow-band light sources corresponding to RGB three colors and an illumination system that collimates and homogenizes three-color illumination light fluxes from the light sources. An LED or an LD can, for example, be used each of the three-color light sources. The light modulating panels 11b can, for example, each be a liquid crystal display panel. The display device (image forming section) 11 is not limited to a unit formed of the illumination apparatus 11a and the light modulating panels 11b and can be a self-luminous display panel, specifically, for example, an organic EL display panel.

The relay system body 12c, when combined with a mirror 31 of the cover-shaped optical system 30, forms a relay system 12, and the relay system 12 is a lens system disposed between the display device 11 and a diffraction optical member 32 and functions as a projection system that re-forms an image formed on a display surface 11d of the display device 11. The relay system body 12c includes a plurality of lenses 14 to 17. Optical surfaces 14a to 17a of the lenses 14 to 17 can each be formed of any of a free-form surface, an aspheric surface, a spherical surface, and any other surface. The lenses 14 to 17 of the relay system body 12c and the mirror 31 cooperate with each other to convert the image formed on the display surface 11d of the display device 11 into an intermediate image CZ enlarged and projected in a position adjacent to the inner side of the cover-shaped optical system 30.

In the relay system 12, the lenses 14 and 15 function as a collimator 12j and cause the image light KK to exit in the form of parallelized light. Further, the relay system 12, which serves as a telecentric system on the side facing the display device 11, causes principal rays SK0 to SK2 from points on the display surface 11d to exit in parallel to one another and roughly in parallel to an optical axis AX (within ±10°) in the direction perpendicular to the display surface 11d. The enlarged intermediate image CZ is conjugate to the display surface 11d of the display device 11, and an imaginary plane CP provided on the light exiting side of the collimator 12j is conjugate to the pupil PU of the eye EY of the viewer KA.

The cover-shaped optical system 30 is a thin-plate-shaped member and is formed of a resin substrate having optical transparency and so processed that an optical function is added to the resin substrate. The cover-shaped optical system 30 includes the mirror 31, which deflects the optical path, and a diffraction optical member 32, which functions as a collimator. The mirror 31 and the diffraction optical member 32 are integrally linked to each other via a linkage section 33 having optical transparency. The cover-shaped optical system 30 of the right virtual image display section 100A and the cover-shaped optical system 30 of the left virtual image display section 100B are linked to and integrated with each other at a portion facing the nose of the viewer KA.

With reference to FIG. 3, the mirror 31 of the cover-shaped optical system 30 cooperates with the relay system body 12c to form the relay system 12, which enlarges an image formed on the display surface 11d of the display device 11 to form the intermediate image CZ, as described above. The mirror 31 has a reflection surface 31a, which is a metal film or a dielectric multilayer film formed on a resin substrate 31b. The reflection surface 31a only needs to be a flat surface as long as it functions as an optical path deflector but can, for example, be a free-form surface, an aspheric surface, or a spherical surface for aberration correction. The resin substrate 31b, which supports the mirror 31, is a member that extends from the diffraction optical member 32.

The diffraction optical member 32 functions as a collimator or a magnifier that collimates or magnifies the intermediate image CZ formed by the relay system 12. The diffraction optical member 32 is curved as a whole along a cylindrical plane extending along a base line parallel to the z-axis direction and includes a diffraction section 34, a light transmissive substrate 35, and an outer substrate 36.

The diffraction section 34 is also curved as a whole along a cylindrical plane, as the diffraction optical member 32 is. The diffraction section 34 is a reflective diffraction element and is either a hologram or a surface relief diffraction grating. In the case where the diffraction section 34 is a hologram, the diffraction section 34 is preferably a volume hologram from a viewpoint of reduction in color separation, particularly preferably a volume-phase-type hologram. In the case where the diffraction section 34 is a surface relief diffraction grating, the diffraction section 34 is preferably a blazed grating from a viewpoint of light use efficiency. A volume hologram is formed of a relatively thick recording medium in which hologram data is recorded in the form of grating. In particular, a volume-phase-type hologram has increased transmittance because hologram data is recorded in the form of a refractive index grating. A surface relief diffraction grating is formed of a thin film on the surface of which an irregular relief corresponding to an interference pattern is formed. In particular, a blazed grating has increased diffraction efficiency because the irregular relief has a sawtooth cross-sectional shape.

The light transmissive substrate (color separation correcting section) 35 is curved along a cylindrical plane. The light transmissive substrate 35 is a plate-shaped member made of polycarbonate, glass, or any other transparent resin material and not only supports the diffraction section 34 but protects the inner side of the diffraction section 34. The light transmissive substrate (color separation correcting section) 35 is curved as a whole but has a uniform thickness thereacross, and produces color separation that causes light obliquely incident thereon to be refracted at an angle of refraction that varies by a relatively large amount on a color basis. The diffraction section 34 is so fixed to an outer surface 35*a* of the light transmissive substrate 35 as to be in intimate contact with the outer surface 35*a*. The light transmissive substrate 35 has high optical transmittance over the visible light wavelength region. Specifically, the light transmissive substrate (color separation correcting section) 35 desirably has transmittance greater than or equal to 50%, when the light transmissive substrate 35 is taken as a bulk excluding surface reflection, from a viewpoint of suppression of loss of the image light KK. Further, the light transmissive substrate (color separation correcting section) 35 is desirably so configured that the transmittance varies 30% at the maximum over the visible wavelength region from a viewpoint of no change in color balance of the image light KK and the outside light. When the conditions described above are satisfied, the light transmissive substrate (color separation correcting section) 35 is assumed to have desirable light transparency that is a precondition that the light transmissive substrate 35 should satisfy. In the case where the image light KK is formed of RGB three light source light fluxes, however, and the light transmissive substrate 35 transmits the light source light fluxes at transmittance of 50% or higher, the light transmissive substrate 35 is assumed to have desirable light transparency. The light transmissive substrate (color separation correcting section) 35 has a thickness of 10 μm or greater, specifically, can be a resin plate having, for example, a thickness ranging from 1 to 2 mm.

The outer substrate 36 is a plate-shaped member made of polycarbonate or any other transparent resin material and protests the outer side of the diffraction section 34. The outer substrate 36 has high optical transmittance over the visible light wavelength region, as the light transmissive substrate 35 does. The outer substrate 36 can be a member common to the resin substrate 31*b* of the mirror 31 and can be integrated with the resin substrate 31*b*. The outer substrate 36, an inner surface 36*a* of which is in intimate contact with the diffraction section 34, can increase the strength of the diffraction optical member 32 including the diffraction section 34. The outer substrate 36 may instead have a structure in which the outer substrate 36 is separate from the diffraction section 34 and is glued or bonded to the light transmissive substrate 35 around the outer circumference of the diffraction section 34.

The diffraction section 34 causes the image light KK from each point on the intermediate image CZ formed by the relay system 12 to be collectively incident in the form of parallelized light on the pupil PU of the eye EY on the basis of the effect provided by the fact that the diffraction section 34 itself is a curved concave surface and the effect provided by a hologram or a diffraction pattern formed on the diffraction section 34. In this process, the principal ray SK1 from one corner (right corner in FIG. 3) of the display surface 11*d* of the display device 11 is incident on the pupil PU from the right front. The principal ray SK2 from another corner (left corner in FIG. 3) of the display surface 11*d* of the display device 11 is incident on the pupil PU from the left front. As a result, an image formed on the display surface 11*d* of the display device 11 is observed in the form of a virtual image present behind the diffraction optical member 32.

The diffraction optical member 32 is roughly transparent as a whole including the diffraction section 34, the light transmissive substrate 35, and the outer substrate 36 to light excluding the image light KK. That is, the hologram or the diffraction pattern on the diffraction section 34 blocks or reflects narrow-band, single color light, but hardly blocks or reflects wide-band light, such as the outside light GK, and roughly uniformly transmits the outside light GK. Further, the diffraction optical member 32 as a whole including the diffraction section 34, the light transmissive substrate 35, and the outer substrate 36 has a roughly uniform thickness, and the thickness is sufficiently thin. The diffraction optical member 32 therefore has a diopter of roughly zero in the see-through observation of an outside image. That is, the viewer KA can observe a bright outside image having little distortion.

An inner surface 32*a* of the diffraction optical member 32 is coated, although not shown, with a hard coat layer, and an antireflection film formed of a dielectric multilayer film is so formed on the hard coat layer as to cover the hard coat layer. An outer surface 32*b* of the diffraction optical member 32 is also coated with a hard coat layer, and an antireflection film formed of a dielectric multilayer film is so formed on the hard coat layer as to cover the hard coat layer.

An example of a method for manufacturing the diffraction optical member 32 will be described. The method includes preparing the outer substrate 36 in advance, forming the diffraction section 34 on the outer substrate 36 or attaching the diffraction section 34 onto the outer substrate 36, then attaching the light transmissive substrate 35 onto the diffraction section 34, and providing a hard coat as a finishing layer. The light transmissive substrate 35 is not necessarily attached and can instead be produced in a deposition process.

Referring back to FIG. 2A and other figures, the frame (holder) 100C includes a main body 71, which is made of a metal or any other rigid material and supports the virtual image display sections 100A and 100B from above, and temples 72, which are made of an elastic material and extend from the opposite ends of the main body. In areas close to the center of the main body 71, upper ends 30*t* of the cover-shaped optical systems 30 are buried in and fixed to the lower surfaces of the areas. Further, in areas close to the opposite ends of the main body 71, upper portions 10*t* of the optical engines 10 are fixed to the lower surfaces of the areas, for example, with an adhesive. A pair of nose pads 74 are attached to the center of the main body 71 (see FIG. 1), although not shown in FIG. 2A or other figures.

Figure 4:
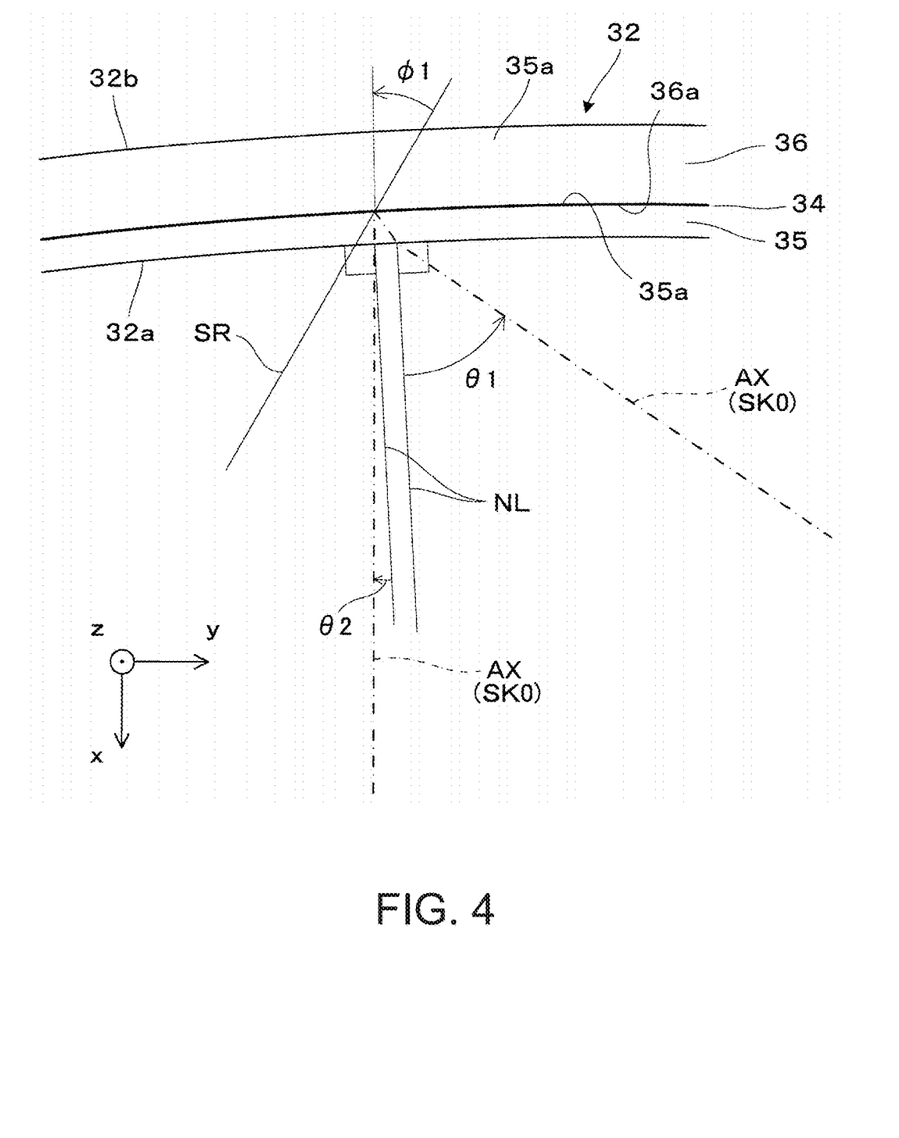
FIG. 4 is an enlarged view for describing image light before and after the image light is incident on a diffraction optical member.

The state of the image light KK before and after it is incident on the diffraction optical member 32 will be described with reference to FIGS. 3 and 4. The image light KK is incident on the diffraction optical member 32 in an oblique incidence state. In the following description, a case where the viewer KA looks at an object right in front of the viewer KA is used as a reference. The optical axis AX of the virtual image display section 100A extends from the design center of the pupil PU of the eye EY in the direction passing through a point right in front of the eye EY (in −x direction in FIGS. 3 and 4), travels via the cover-shaped optical system 30 and the relay system body 12*c*, and intersects the center of the display surface 11*d* of the display device 11. That is, the principal ray SK0 exited from the center of the display surface 11*d* of the display device 11 travels along the optical axis AX and impinges on the center of the pupil PU of the eye EY along the direction passing through a point right in front of the eye EY. In this case, consider the incident angle and the exiting angle of the image light KK with respect to the inner surface 32a of the diffraction optical member 32. The incident angle θ1 of the image light KK incident on the inner surface 32a is the angle with respect to a normal NL to the inner surface 32a and ranges from 50 to 80° (more preferably from 60 to 70°) on the assumption that the counterclockwise direction is the positive direction in the drawings. The image light KK refracted at the inner surface 32a is diffracted at the diffraction section 34 of the diffraction optical member 32, and the orientation of the image light KK therefore changes. In the diffraction process, the specular reflection direction SR is used as the reference, and the inclination angle of the diffracted image light KK with respect to the specular reflection direction SR represents the diffraction angle ϕ1. The diffraction angle ϕ1 is roughly half the incident angle θ1 on the assumption that the counterclockwise direction is the positive direction in the drawings. The exiting angle θ2 of the image light KK refracted at the inner surface 32a has a slightly negative value on the assumption that the counterclockwise direction is the positive direction in the drawings or hardly inclines with respect to the optical axis AX. That is, the image light KK exits roughly in the normal direction or at the exiting angle θ2 ranging roughly from 0 to 20°. In a case where the diffraction optical member 32 is so disposed as to incline by a relatively large amount with respect to a front vision axis extending in the direction passing through a point right in front of the eye EY, the exiting angle θ2 of the image light KK may exceed 20° as a result of the situation in which the optical axis AX is parallel to the front view axis.

The image light KK observed when the viewer KA looks at an object right in front of the viewer KA has been described. Also in a case where the viewer KA looks at an object in an oblique direction, an angular condition similar to the above applies. That is, also in the case of an optical path that deviates from the optical axis AX, the incident angle of the image light KK incident on the inner surface 32a of the diffraction optical member 32 ranges from about 50 to 80° (more preferably from 60 to 70°), which is an oblique incidence state. The exiting angle θ2 of the image light KK from the inner surface 32a is roughly 0° also in the case of an optical path that deviates from the optical axis AX, which means almost no inclination.

Color separation and color dispersion produced by the diffraction optical member 32 will be described with reference to FIG. 5A. It is assumed in this case that the diffraction section 34 is designed with reference to the image light KK having a single wavelength (green light, for example).

In a case where the incident angle θ1 of the image light KK externally incident on a point P1 on the inner surface of the 32a of the diffraction optical member 32 and refracted at the inner surface 32a ranges from 50 to 80°, the refraction angle θ21 of the image light KK increases as the wavelength increases to a longer wavelength KR, such as red, drawn by the dotted line, and the amount of color separation of the refraction angle θ21 increases in the counterclockwise direction as the wavelength increases. The diffraction angle ϕ1 of the image light KK incident on a point P2 on the diffraction section 34 of the diffraction optical member 32 and diffracted at the diffraction section 34 increases as the wavelength increased to the longer wavelength KR, such as red, and the amount of color separation of the diffraction angle ϕ1 increases in the counterclockwise direction as the wavelength increases. In the state shown in FIG. 5A, however, since the refracted light from the point P1 and the diffracted light from the point P2 are travel in opposite directions because the diffracted light is deflected, color separation S1 (Δλ, θ1) of the refraction angle θ21 produced by the refraction at the time of incidence and the color separation S2 (Δλ, ϕ1) of the diffraction angle ϕ1 have different signs and are therefore oriented in opposite directions. Further, the exiting angle θ2 of the image light KK internally incident on a point P3 on the inner surface 32a of the diffraction optical member 32 and refracted at the inner surface 32a decreases as the wavelength increases to the longer wavelength KR, such as red, and the amount of color separation of the exiting angle θ2 decreases in the counterclockwise direction as the wavelength increases. That is, in the state shown in FIG. 5A, the color separation S2 (Δλ, ϕ1) of the diffraction angle ϕ1 and color separation S3 (Δλ, θ2) of the exiting angle θ2 produced by the refraction at the time of exit have the same sign and are therefore oriented in the same direction. That is, the total color separation CS (Δλ) produced by the diffraction optical member 32 is given by the following expression.

$$CS(\Delta\lambda)=S1(\Delta\lambda,\theta1)-S2(\Delta\lambda,\phi1)-S3(\Delta\lambda,\theta2) \quad (1)$$

Figure 5A:
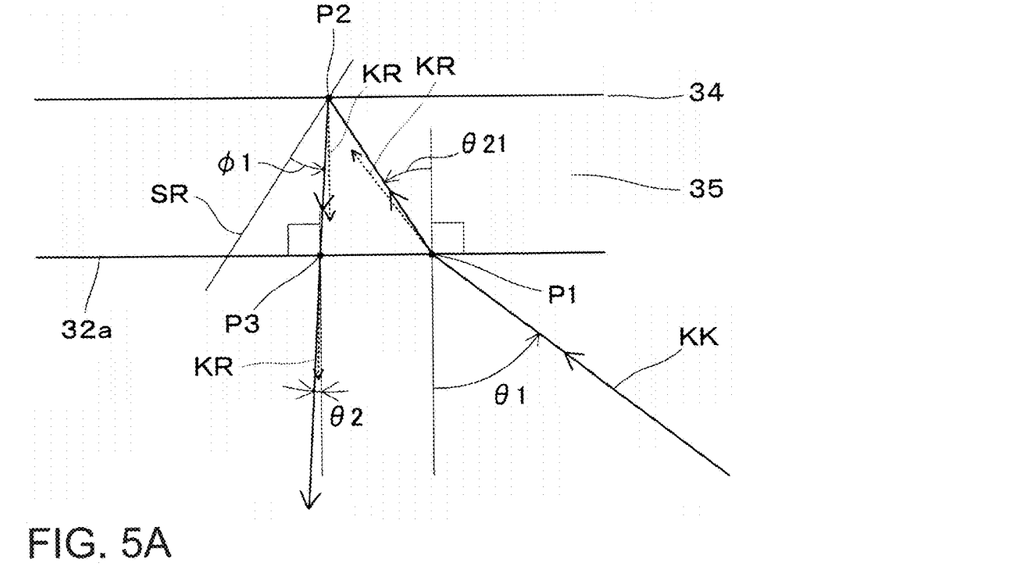
FIG. 5A is an enlarged cross-sectional view for describing an example of correction of color separation.

In the case where the image light KK is shifted from the normal to the inner surface 32a toward the specular reflection direction SR, as shown in FIG. 5A, the color separation S3 (Δλ, θ2) of the exiting angle θ2 and the color separation S2 (Δλ, ϕ1) of the diffraction angle ϕ1 are oriented in the same direction, whereas in a case where the image light KK inclines with respect to the normal to the inner surface 32a toward the side where the image light KK is incident, the color separation S3 (Δλ, θ2) of the exiting angle θ2 and the color separation S2 (Δλ, ϕ1) of the diffraction angle ϕ1 are oriented in opposite directions. Also in this case, determining the sign of the color separation S3 (Δλ, θ2) in accordance with the sign of the exiting angle θ2 allows the total color separation CS (Δλ) according to the sign of the exiting angle θ2 to be obtained from. Expression (1) described above. The reason why the positive or negative color separation S3 (Δλ, θ2) produced by the refraction at the time of exit is subtracted from the color separation S1 (Δλ, θ1) produced by the refraction at the time of incidence is that the absolute value of the color separation S1 (Δλ, θ1) is relatively large and dominant and has a sign different from the sign of the color separation S2 (Δλ, θ1) of the diffraction angle ϕ1 or is oriented in the opposite direction. That is, the color separation produced by the light transmissive substrate 35 cancels or reduces the color separation produced by the diffraction section 34.

Assuming that the other portion of the virtual image display section 100A produces no color separation, canceling the total color separation CS (Δλ) described above to be roughly zero allows the color separation S2 (Δλ, ϕ1) produced by the diffraction at the diffraction section 34 to be corrected by the color separation S1 (Δλ, θ1) and S3 (Δλ, θ2) produced by the refraction in the light transmissive substrate 35, whereby the cancellation of the color separation prevents color bleeding.

The color separation produced in the vicinity of the optical axis AX has been described. Also at a location separate from the optical axis AX in the y direction or the z direction, color separation produced by the diffraction at the diffraction section 34 can be similarly corrected by color separation produced by the refraction in the light transmissive substrate 35. In this case, the light transmissive substrate 35 functions as a color separation correcting section that corrects color separation produced by the diffraction section 34.

The color separation or color dispersion produced by the diffraction optical member 32 is desirably expressed by using the Abbe number as an index of the degree of color dispersion produced by the light transmissive substrate (color separation correcting section) 35. The Abbe number is given by the following expression.

$$\nu d=(nd-1)/(nF-C)$$

where
nd: refractive index at d line (587.56 nm)
nF: refractive index at F line (486.1 nm)
nC: refractive index at C line (656.3 nm)

In the case where the light transmissive substrate 35 is used as the color separation correcting section, as described above, the color separation is desirably relatively large, and the Abbe number of the light transmissive substrate 35 is therefore set, for example, at about 40 or smaller.

Figure 5B:
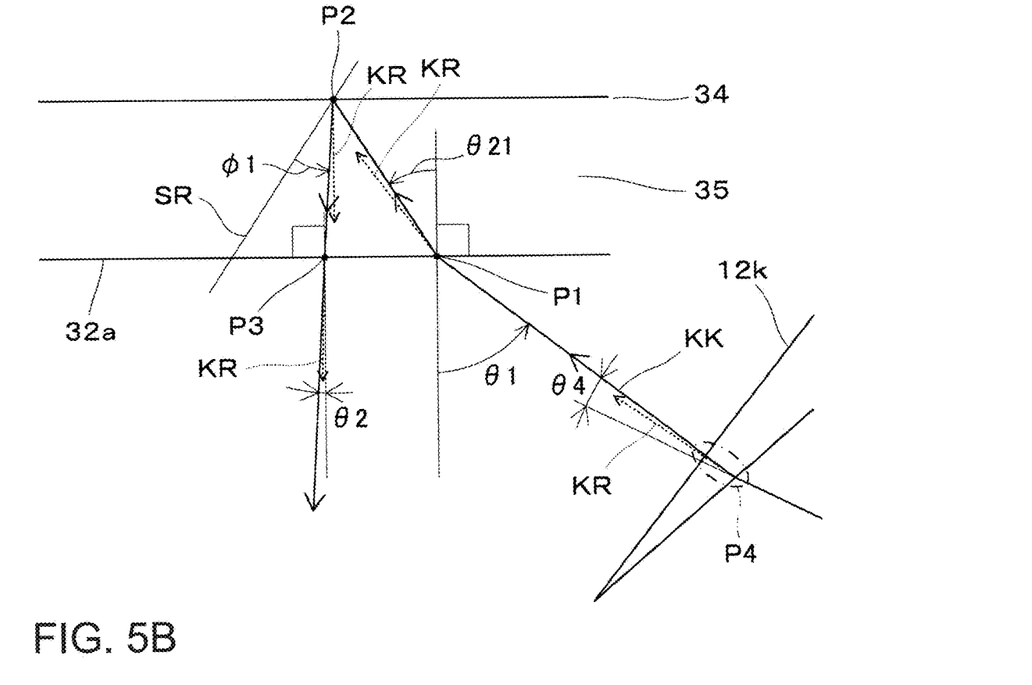
FIG. 5B is an enlarged cross-sectional view for describing another example of the correction of color separation.

FIG. 5B describes a case where a wedge prism component 12k is present in the relay system 12 or at any other location. The wedge prism component 12k has a vertex on the left in FIG. 5B and on the −y side, where the nose of the viewer KA is present. In this case, the deflection produced by the wedge prism component 12k rotates the image light KK clockwise to achieve a deflection angle θ4 at a deflection location P4. The deflection angle θ4 produced by the wedge prism component 12k decreases as the wavelength increases to the longer wavelength KR, such as red, and the amount of color separation of the deflection angle θ4 decreases in the counterclockwise direction as the wavelength increases. That is, in the state shown in FIG. 5B, color separation S4 (Δλ, θ4) of the deflection angle θ4 and color separation S1 (Δλ, θ1) of the incident angle θ1 have the same sign and are therefore oriented in the same direction. As a result, the total color separation CS (Δλ) produced by the diffraction optical member 32 and the wedge prism component 12k is given by the following expression.

$$CS(\Delta\lambda)=S1(\Delta\lambda,\theta 1)-S2(\Delta\lambda,\phi 1)-S3(\Delta\lambda,\theta 2)+S4(\Delta\lambda,\theta 4) \quad (2)$$

That is, the color separation produced by the diffraction at the diffraction section 34 can be corrected by the color separation produced by the refraction in the light transmissive substrate 35 and the wedge prism component 12k. In this case, the light transmissive substrate 35 and the wedge prism component 12k function as the color separation correcting section that corrects the color separation produced by the diffraction section 34. In other words, the light transmissive substrate 35 cooperates with the relay system 12, which is a lens system, to correct the color separation produced by the diffraction section 34.

In a case where the wedge prism component 12k is located in a position upstream of the mirror 31 in the optical path, the effect of the wedge prism component 12k is reversed in the rightward/leftward direction. Further, in a case where the wedge prism component 12k has a vertex on the right in FIG. 5B and on the +y side, where the ear of the viewer KA is present, unlike in FIG. 5B, the sign of S4 (Δλ, θ4) is reversed. That is, the direction of the color separation produced by the wedge prism component 12k can be so adjusted as to be swapped by selecting the position where the wedge prism component 12k is disposed from positions upstream and downstream of the mirror 31 or selecting the posture of the wedge prism component 12k from the rightward and leftward postures. The wedge prism component 12k can be an independent element that forms the relay system 12 or can be integrated with any of the lenses 14 to 17 of the relay system 12. In this case, the optical surfaces 14a to 17a of the lenses 14 to 17 incline with respect to a cross section parallel to the yz plane.

In the above description, the diffraction section 34 is assumed to be a diffraction element or any other component designed with reference to the image light KK having a single wavelength. In the case where the diffraction section 34 is a volume-phase-type hologram, however, the diffraction section 34 can be so designed as not to produce color separation by itself. Even in this case, since color separation produced by the light transmissive substrate 35 is left, the diffraction section 34 is preferably so adjusted as to produce appropriate color separation that allows the sum of the color separation produced by the light transmissive substrate 35 and the color separation produced by the diffraction section 34, that is, the total color separation CS (Δλ) to be reduced to zero.

That is, in the virtual image display apparatus 100 according to the first embodiment, since the light transmissive substrate 35 is the color separation correcting section that corrects the color separation produced by the diffraction section 34, the color separation produced by the diffraction at the diffraction section 34 can be corrected without any increase in the size of the relay system 12 or any other component, whereby high-definition color display is achieved. It is noted that the light transmissive substrate 35 corrects the color separation produced by the diffraction at the diffraction section 34 on the basis of the color separation produced by the combination of the refraction of the image light KK at the time of incidence and the refraction of the image light KK having undergone the angular conversion at the diffraction section 34 at the time of exit.

Second Embodiment

A virtual image display apparatus according to a second embodiment will be described below. The virtual image display apparatus according to the present embodiment is a variation of the virtual image display apparatus according to the first embodiment, and portions common to those in the first embodiment will not be described.

Figure 6:
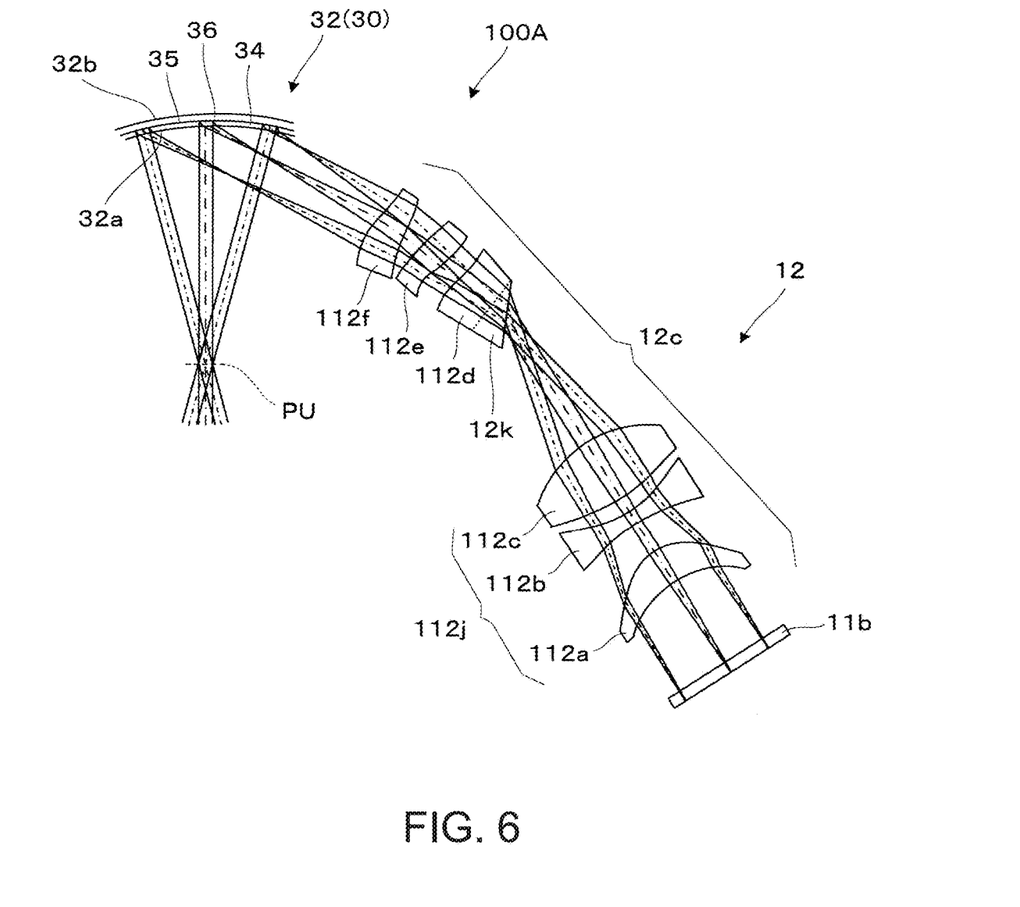
FIG. 6 is a plan view for describing a virtual image display apparatus according to a second embodiment.

FIG. 6 describes the optical configuration of the virtual image display section 100A of the virtual image display apparatus according to the second embodiment. In this case, the cover-shaped optical system 30 is formed only of the diffraction optical member 32, and the relay system 12 is formed of the relay system body 12c from which the mirror 31 is omitted. The relay system body 12c includes a collimator 112j and three lenses 112d, 112e, and 112f sequentially arranged from the light incident side. Further, the collimator 112j includes three lenses 112a, 112b, and 112c.

In the relay system body 12c, for example, the lens 112d includes the wedge prism component 12k. When the color separation produced by the diffraction at the diffraction section 34 is corrected by the light transmissive substrate 35 and other components, the lens 112d is therefore an element that affects the correction of the color separation.

Third Embodiment

A virtual image display apparatus according to a third embodiment will be described below. The virtual image display apparatus according to the present embodiment is a variation of the virtual image display apparatus according to the first embodiment, and portions common to those in the first embodiment will not be described.

Figure 7:
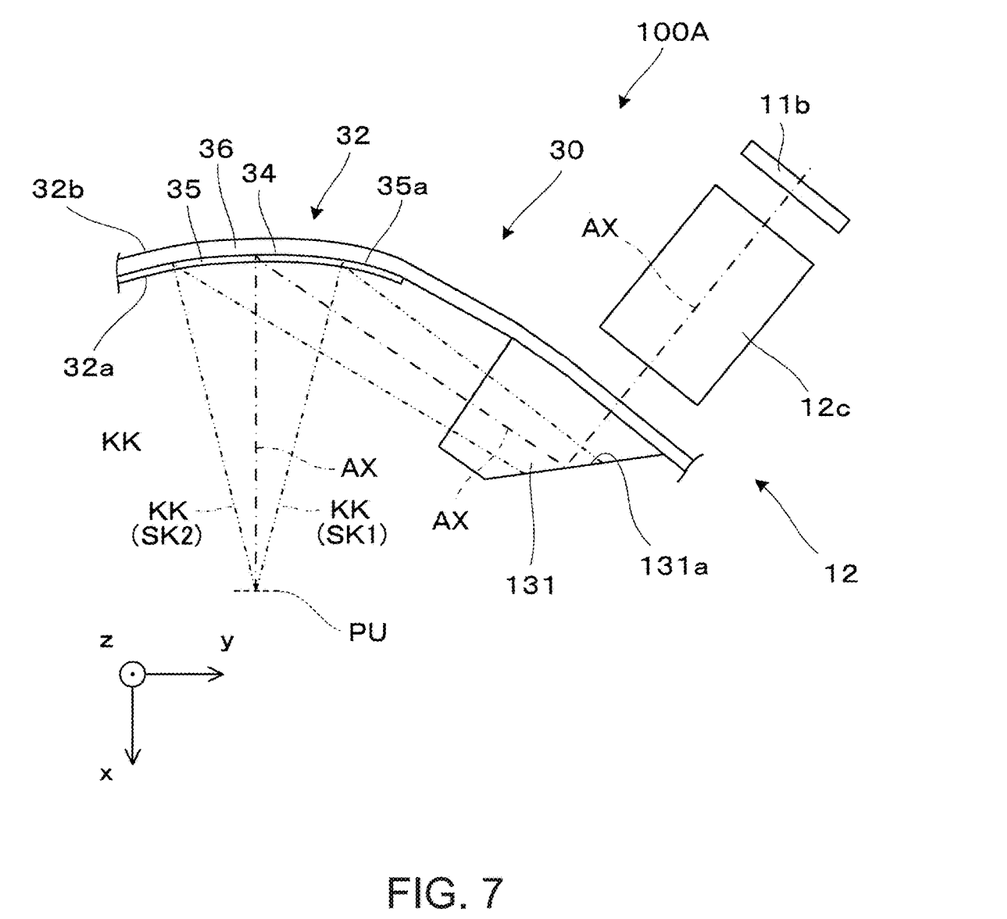
FIG. 7 is a plan view for describing a virtual image display apparatus according to a third embodiment.

FIG. 7 describes the optical configuration of the virtual image display section 100A of the virtual image display apparatus according to the third embodiment. In this case, a prism 131 is attached at the location where the mirror 31 of the cover-shaped optical system 30 is present in the first embodiment. The prism 131 has an inclining surface that forms an inner reflection surface 131a, which deflects the optical path of the image light KK incident from the light modulating panels 11b, which are disposed outside the cover-shaped optical system 30, via the relay system body 12c to cause the image light KK to be obliquely incident on the diffraction optical member 32. The inner reflection surface 131a can, for example, be a flat surface, a free-form surface, an aspheric surface, or a spherical surface. The relay system body 12c, although will not be described in detail, includes a plurality of lenses, as in the first embodiment. The relay system body 12c may include a mirror that deflects the optical path.

Fourth Embodiment

A virtual image display apparatus according to a fourth embodiment will be described below. The virtual image display apparatus according to the present embodiment is a variation of the virtual image display apparatus according to the first embodiment, and portions common to those in the first embodiment will not be described.

Figure 8A:
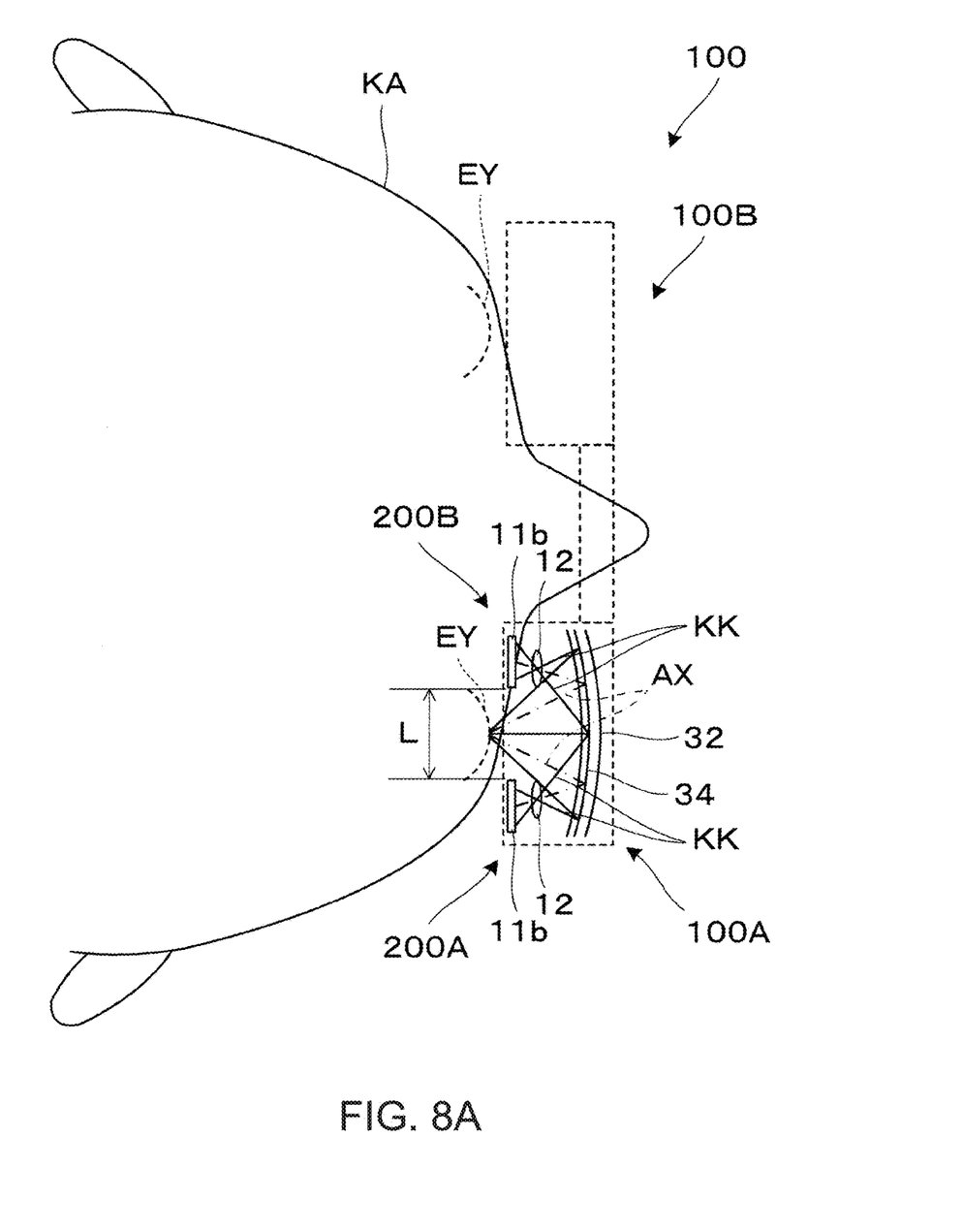
FIG. 8A is a plan view of a virtual image display apparatus according to a fourth embodiment.
Figure 8B:
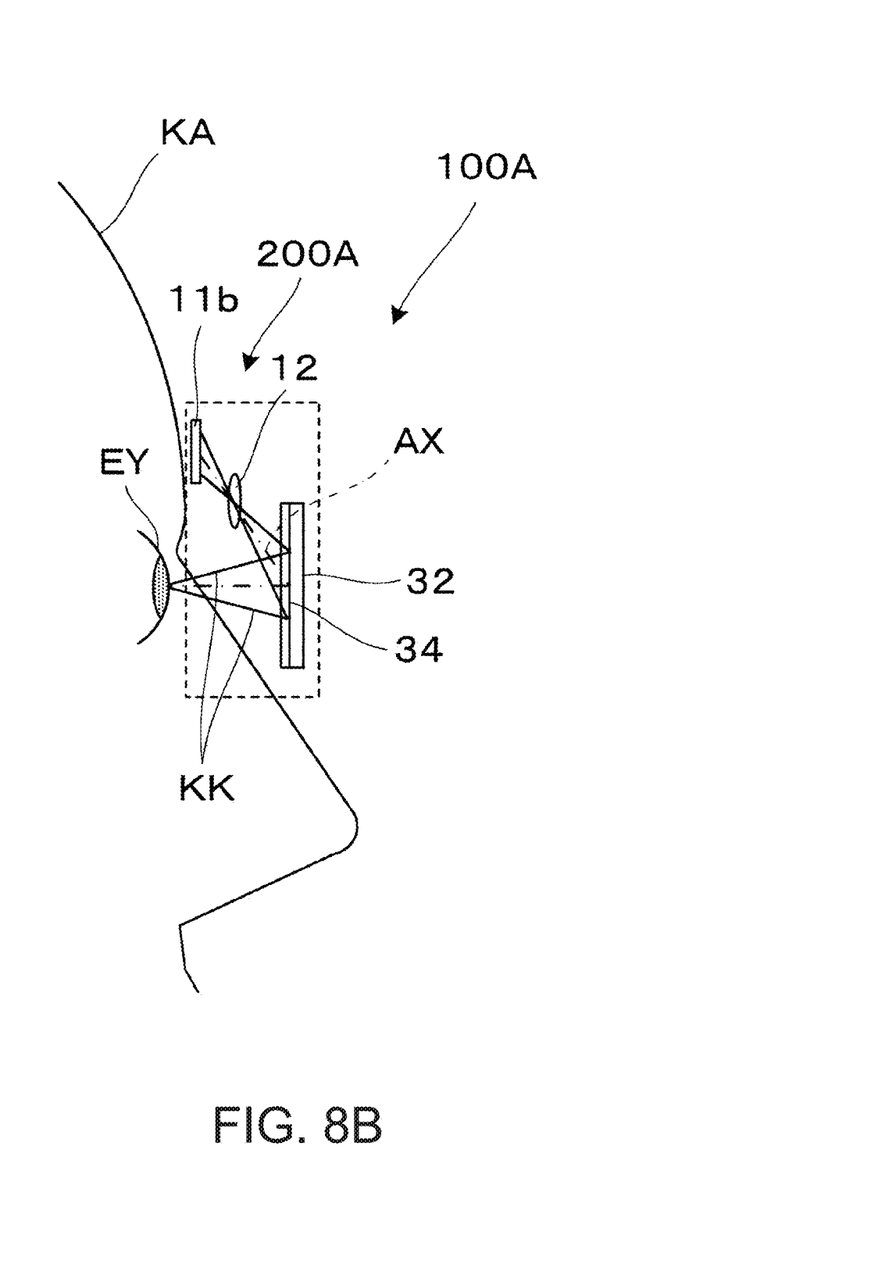
FIG. 8B is a side view of the virtual image display apparatus according to the fourth embodiment.

FIG. 8A is a conceptual plan view for describing the optical configuration of the virtual image display apparatus 100 according to the fourth embodiment. FIG. 8B is a conceptual side view for describing the optical configuration of the virtual image display apparatus 100 according to the fourth embodiment. In the virtual image display apparatus 100, the right virtual image display section 100A, for example, includes a first virtual image display section 200A and a second virtual image display section 200B so arranged as to be adjacent to each other in the lateral direction in which the eyes EY are arranged. The diffraction optical member 32 of the first virtual image display section 200A is common to the diffraction optical member 32 of the second virtual image display section 200B, and a continuous image can be projected via the common diffraction optical member 32. The first virtual image display section 200A has the same structure as that of the virtual image display section 100A shown in FIG. 3 and other figures except that the first virtual image display section 200A includes a vertical projection system that does not cause the image light KK to be obliquely incident on the diffraction optical member 32 in the lateral direction in which the eyes EY are arranged but causes the image light KK to be incident obliquely downward on the diffraction optical member 32 in the vertical direction. The second virtual image display section 200B also has the same structure as that of the virtual image display section 100A shown in FIG. 3 and other figures except that the second virtual image display section 200B includes a vertical projection system that does not cause the image light KK to be obliquely incident on the diffraction optical member 32 in the lateral direction in which the eyes EY are arranged but causes the image light KK to be incident obliquely downward on the diffraction optical member 32 in the vertical direction. The distance between the first virtual image display section 200A and the second virtual image display section 200B in the lateral direction is adjusted as appropriate, and the inter-optical-portion distance L has a relatively large value.

In the virtual image display apparatus 100 according to the fourth embodiment, the virtual image display section 100A on one side includes the plurality of virtual image display sections 200A and 200B, and each of the virtual image display sections 200A and 200B includes the light modulating panels 11b, which form the image forming apparatus, and the relay system 12, which forms the projection system. The virtual image display sections 200A and 200B each independently cause the image light KK having a predetermined viewing angle (specifically, right half viewing angle or left half viewing angle) out of the viewing angle of the image light incident on the eye EY to be incident. The light modulating panels 11b and the relay system 12 of each of the virtual image display sections 200A and 200B are disposed above the front view direction, cause the image light KK to be incident on the diffraction optical member 32 over roughly the same angular range in the upward/downward direction but cause the image light KK to be incident on the diffraction optical member 32 over different angular ranges in the rightward/leftward direction (angular ranges reversed in rightward/leftward direction in illustrated example).

The virtual image display apparatus 100 according to the fourth embodiment allows a compact light modulating panel to be employed as each of the plurality of light modulating panels 11b to widen the viewing angle by use of a hologram element in the diffraction section 34 and further allows the distance L between the optical portions (light modulating panels 11b and relay system 12) to be sufficiently large, whereby the flexibility of the arrangement of the optical portions in the virtual image display section 100A can be increased.

Other Variations and the Like

The invention has been described with reference to the embodiments, but the invention is not limited thereto and can be implemented in a variety of other aspects to the extent that they do not depart from the substance of the invention. For example, the following variations are conceivable.

For example, the light transmissive substrate 35 or the diffraction section 34 does not necessarily have a cylindrical surface and can have any of a flat surface, a spheroidal surface, and a free-form surface.

In the embodiments described above, the image light KK that exits from each point on the intermediate image CZ exits in the form of parallelized light toward the pupil PU of the eye EY via the diffraction section 34, which means that the virtual image is located at infinity. Arranging the virtual image at infinity is, however, not essential, and the arrangement of the virtual image can be adjusted as appropriate in accordance with the applications.

A see-through virtual image display apparatus has been described above. In a case where observation of an outside image is not required, the outer surface 32b of the diffraction optical member 32 can be covered with a light blocker.

The above description has been specifically made on the assumption that the virtual image display apparatus 100 according to each of the embodiments is a head mounted display. The virtual image display apparatus 100 according to each of the embodiments can be modified to a head-up display.

In the above description, the virtual image display apparatus 100 includes the pair of virtual image display sections 100A and 100B in correspondence with the right and left eyes. Instead, a virtual image display section may be provided in correspondence only with one of the right and left eyes for monocular vision.

The entire disclosure of Japanese Patent Application No. 2016-192988, filed Sep. 30, 2016 is expressly incorporated by reference herein.

What is claimed is:

1. A virtual image display apparatus comprising:
a diffraction optical member including a diffraction section that directs orientation of image light based on diffraction toward a position of a viewer's eye and a light transmissive substrate that is disposed in the diffraction section and on a side facing the eye and supports the diffraction section; and an image forming section that outputs the image light toward the diffraction optical member, wherein the light transmissive substrate is a color separation correcting section that corrects color separation produced by the diffraction section.

2. The virtual image display apparatus according to claim 1, wherein color separation produced by refraction of the image light when the image light is incident on the light transmissive substrate and exits out of the light transmissive substrate is oriented in a direction opposite a direction of the color separation produced by the diffraction section.

3. The virtual image display apparatus according to claim 1, wherein an incident angle of the image light incident on the diffraction optical member ranges from 50 to 80° with reference to a case where a viewer looks at an object right in front of the viewer.

4. The virtual image display apparatus according to claim 3, wherein the diffraction section causes obliquely incident image light to exit roughly in a direction of a normal to a surface that forms the light transmissive substrate and faces the diffraction section.

5. The virtual image display apparatus according to claim 1, wherein the color separation correcting section transmits the image light at transmittance of 50% or higher.

6. The virtual image display apparatus according to claim 1, wherein the light transmissive substrate has any of a flat surface, a spheroidal surface, a cylindrical surface, and a free-form surface.

7. The virtual image display apparatus according to claim 1, wherein the diffraction optical member includes a light transmissive outer substrate disposed outside the light transmissive substrate via the diffraction section.

8. The virtual image display apparatus according to claim 1, wherein the diffraction optical member has a diopter of roughly zero in see-through observation of an outside object.

9. The virtual image display apparatus according to claim 1, wherein the diffraction section is one of a hologram and a surface relief diffraction grating.

10. The virtual image display apparatus according to claim 1, further comprising a lens system disposed between the image forming section and the diffraction optical member, wherein the light transmissive substrate cooperates with the lens system to correct the color separation produced by the diffraction section.

11. The virtual image display apparatus according to claim 10, wherein the lens system includes a mirror that deflects an optical path.

12. The virtual image display apparatus according to claim 11, wherein the mirror is supported by a member that extends from the diffraction optical member.

13. The virtual image display apparatus according to claim 10, wherein an intermediate image is formed between the lens system and the diffraction optical member.

14. The virtual image display apparatus according to claim 13, wherein the image forming section outputs the image light with principal rays thereof roughly parallelized, and the diffraction optical member parallelizes the image light from the intermediate image.

15. The virtual image display apparatus according to claim 1, further comprising a holder that holds the diffraction optical member and the image forming section to allow the diffraction optical member and the image forming section to be located in front of the viewer's eye.

* * * * *